Oct. 9, 1956   F. E. STEVENS, JR., ET AL   2,766,316
DRY CELL STRUCTURE AND METHOD FOR MAKING THE SAME
Filed March 24 1953

INVENTORS
Franklyn E. Stevens, Jr.
Russell A. Holmes
BY
Pennie, Edmonds, Morton, Barrows & Taylor
ATTORNEYS United States Patent Office 2,766,316
Patented Oct. 9, 1956

2,766,316

DRY CELL STRUCTURE AND METHOD FOR MAKING THE SAME

Franklyn E. Stevens, Jr., New Haven, and Russell A. Holmes, Hamden, Conn., assignors to Olin Mathieson Chemical Corporation, a corporation of Virginia Application March 24, 1953, Serial No. 344,402

4 Claims. (Cl. 136—133)

This invention relates to dry cells, and more particularly concerns a dry cell construction which may be used in cells of the general type employed for powering flashlights and in similar applications. The invention also includes a method for assembling a seal for the cell.

Known dry cells of the type used, for example, in flashlights generally comprise an open topped can of zinc, which acts as the cell anode and a central carbon pencil protruding from the open end of the can, which acts as the cell cathode. Within the can, the cathode pencil is surrounded by a core of depolarizing mixture, usually comprising manganese dioxide and carbonaceous material, and an electrolyte, usually in the form of an aqueous paste fills the space between the depolarizing core and the zinc can. In conventional dry cell constructions, the open topped can is sealed by a layer of material capable of being softened and rendered flowable by heat, usually wax.

The wax seals of dry cells of the type described are unsatisfactory for several reasons. When subjected to moderately high temperatures, such as those encountered during storage in warm climates or seasons, the wax seals soften, with the result that water vapor escapes from the seal, the electrolyte becomes dehydrated, and the capacity and useful life of the cell are reduced. This loss of water vapor is aggravated by the fact that the hydrogen evolved within the cell forces its way out through the softened wax seal and carries water vapor with it. The softened wax may also be forced out around the top seal of the cell and so renders the cell unmarketable.

With the foregoing in mind, it is proposed, in accordance with the present invention, to provide an improved dry cell which is capable of withstanding extended storage at elevated temperatures without substantial loss of capacity. More specifically, the cell of the invention embodies a seal for the electrolyte, which is impervious or substantially impervious to water vapor, is resistant to the electrolyte, is not softened or rendered pervious by any temperatures encountered in storage or use, and which is readily and inexpensively incorporated in the cell structure. According to one aspect of the invention, the improved seal is not only impervious to water vapor but is permeable to hydrogen to permit relief of hydrogen evolved within the cell without substantial loss of water from the electrolyte.

In describing the invention in detail, reference will be made to the accompanying drawings, in which an embodiment of the invention is illustrated.

Figure 1:
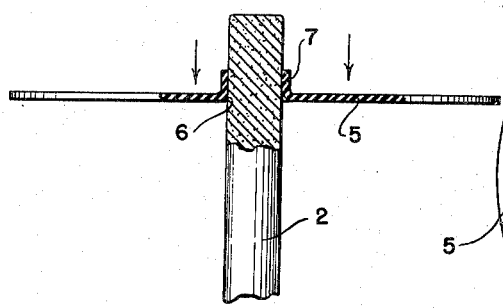
Fig. 1 is a sectional view of carbon pencil cathode and a sealing gasket or disc showing a method of assembling an embodiment of the invention.

Referring to the drawing, a zinc can of conventional construction which forms the anode of the dry cell is illustrated at 1. In the completed cell, the can 1 carries a central cathode forming carbon pencil 2, which projects slightly beyond the open top of the can, a core 3 of depolarizing mixture, usually manganese dioxide, and a carbonaceous material, such as graphite, powdered carbon, and the like, and an aqueous electrolyte paste 4 containing the usual electrolytes and filling the space between the depolarizing mixture core 3 and the can 1.

In accordance with the invention, the upper end of the cell is sealed by means of a sealing gasket or disc 5 formed of what may be conveniently termed a rubberlike material. More specifically, this material is resilient, resistant to the electrolyte of the cell, substantially impervious to water vapor, and preferably permeable to hydrogen. It is capable of withstanding temperatures encountered in storage and use of the cell. Polyethylene, and particularly heat-resistant grades of polyethylene, comprise a preferred material for the sealing disc 5, but other materials, such as polytetrafluoroethylene, polychlorotrifluoroethylene, natural rubber, rubbery vinyl copolymers, and rubbery vinylidene chloride copolymers may be employed.

Figure 2:
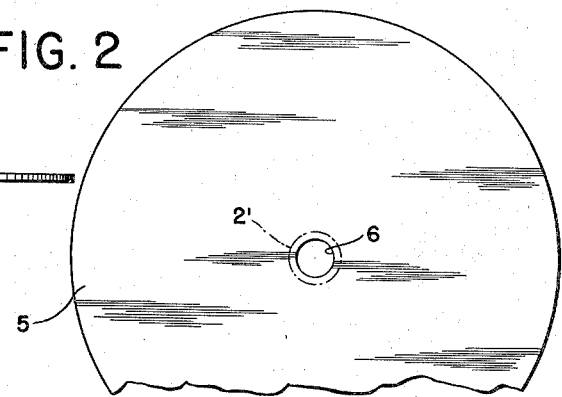
Fig. 2 is a plan view of the sealing disc.

The sealing disc 5 is circular and, before application to the cell, is of considerably greater diameter than the can 1, as is illustrated in Fig. 2. The disc is provided with a central circular opening 6 of somewhat smaller diameter than that of the carbon pencil 2. The diameter of the pencil 2 is illustrated in Fig. 2 by a dot and dash line 2'.

Figure 3:
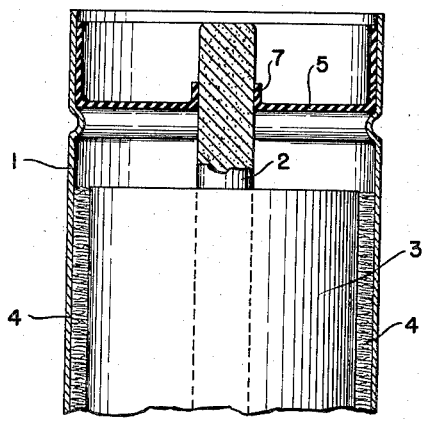
Fig. 3 is a partial sectional elevation of a dry cell incorporating the invention in the first stage of assembly.
Figure 5:
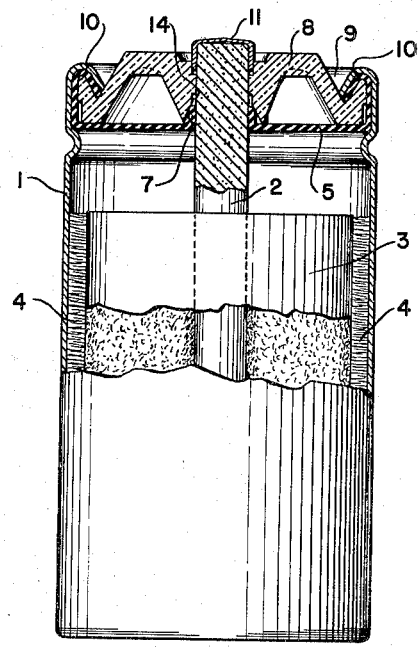
Fig. 5 is an elevation, partly in section, showing a completely assembled dry cell embodying the invention.
Figure 4:
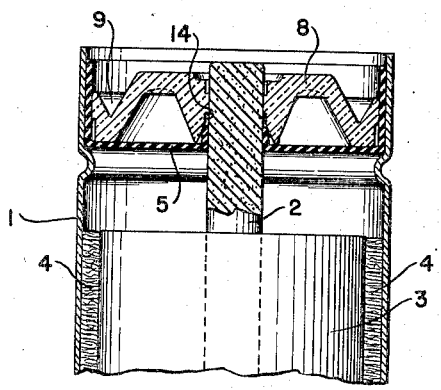
Fig. 4 is a view similar to Fig. 3, showing the cell in a subsequent stage of assembly.

In order to incorporate the sealing disc 5 in the cell structure, the disc is forced down over the protruding upper end of the carbon pencil 2 so that the pencil forces its way through the central disc openings 6. This stretches the resilient material of the disc and forms a short neck or sleeve 7 of the disc material around the pencil 2 and extending upwardly from the plane of the disc, as shown in Figs. 1 and 3. This sleeve 7 and the disc 5 tightly grip the carbon pencil 2 due to the resilience of the material from which the disc is formed. By this operation of forcing the disc over the upper end of the pencil, the outer edge of the disc 5 is bent upwardly into cupped form by the can top edge, as is illustrated in Fig. 3. A top closure 8 of a size to be received within the open top end of the can 1 and having a central opening 14 to receive the carbon pencil 2 is then inserted in the top end of the can over the sealing disc 5. The closure 8 is formed of a suitable substantially rigid thermoplastic or thermosetting insulating material, such as polystyrene, phenol formaldehyde resin, or the like. The lower end of the central closure disc opening 14 is flared outward slightly so that as the closure 8 is forced down over the carbon pencil 2, the upstanding sleeve 7 of the sealing disc 5 is compressed between the closure 8 and the carbon pencil 2 to form a tight seal at this point. The closure 8 is provided with an annular groove 9 in its upper surface near its peripheral edge, and the top edge of the can 1, together with the edge of the sealing disc 5, is rolled inward to provide a firm roll crimp 10 which retains the disc 5 in place and tightly seals the can 1 to the disc 5 and the closure 8. The usual metal contact cap 11 is then forced over the protruding outer end of the carbon pencil 2 and the assembly is complete, as shown in Fig. 5.

The cell constructed in accordance with the invention has the advantage that it does not dry out, lose is capacity or lose its top sealing material even when stored at high temperatures for considerable periods. Its sealing parts are simple and easy to assemble.

Cells constructed according to the invention exhibit considerably greater capacity after storage at elevated temperatures than do conventional cells sealed with wax, pitch or like heat-flowable materials. In the tests of which the results are tabulated below, each cell was stored for two weeks at 160° F. In the tests of which the results are given in the column designated "A," each cell, after such storage, was discharged through a resistance of 6⅔ ohms for a period of four minutes every thirty minutes for ten hours a day and five days a week, until the cell voltage had dropped from the initial value of 1½ volts to 0.93 volt. The results are given in terms of total days of test. In the tests of which the results are given in the column designated "B," each cell, after high temperature storage, was continuously discharged through a resistance of 83⅓ ohms until the cell voltage had dropped to 1.13 volts. The results of test "B" are given in terms of total hours of the test. In the tests of which the results are given in the column designated "C," the cells were discharged through a resistance of ten ohms for four hours a day five days a week until the cell voltage had dropped to 0.90 volt. The results of the test "C" are given in terms of the total hours of discharge.

| Cell Seal | Test "A," days | Test "B," hours | Test "C," hours |
|---|---|---|---|
| Wax | 6.8 | 107 | 10.4 |
| Polyethylene Disc | 11.0 | 169 | 17.8 |

We claim:

1. A closure for a dry cell comprising an open ended zinc can and a centrally arranged carbon cathode pencil extending from the open end of the can, characterized in that the closure comprises a disc of resilient rubber-like material of greater diameter than the diameter of the can and having a central opening of smaller diameter than that of the carbon pencil forced downwardly over the pencil into the open mouth of the can forming a sleeve surrounding the pencil to prevent leakage of gases and a cupped edge portion on the inner wall of the can, and a substantially rigid member arranged over the disc and compressively engaging the sleeve and the cupped edge portion of the disc.

2. A dry cell according to claim 1, in which the disc is formed of a material selected from the class consisting of polyethylene, polytetrafluoroethylene, polychlorotrifluoroethylene, natural rubber, rubbery vinyl copolymers, and rubbery vinylidene chloride copolymers.

3. A dry cell according to claim 1, in which the disc is formed of polyethylene.

4. A closure for a dry cell comprising an open ended zinc can and a centrally arranged carbon cathode pencil extending from the open end of the can, characterized in that the closure comprises a disc of resilient rubber-like material of greater diameter than the diameter of the can and having a central opening of smaller diameter than that of the carbon pencil forced downwardly over the pencil into the open mouth of the can forming a sleeve surrounding the pencil and a cupped edge portion on the inner wall of the can, a substantially rigid closure having a central aperture with a flared lower mouth disposed within the open end of the can over said disc and having a groove on its outer surface adjacent its peripheral edge, the flared lower mouth of the closure aperture compressively engaging the sleeve of said disc and forcing it against said cathode pencil and a roll crimp at the open edge of said can compressively forcing the edge of said disc into said closure groove.

References Cited in the file of this patent

UNITED STATES PATENTS

| 902,173 | Schauli | Oct. 27, 1908 |
| 1,137,030 | Smith | Apr. 27, 1915 |
| 2,642,470 | Reinhardt et al. | June 16, 1953 |

FOREIGN PATENTS

| 275,977 | Germany | Nov. 16, 1913 |
| 313,275 | Germany | June 9, 1918 |
| 56,713 | Denmark | Sept. 25, 1939 |